United States Patent
Wright

(10) Patent No.: US 11,764,947 B2
(45) Date of Patent: Sep. 19, 2023

(54) SYSTEMS AND METHODS FOR STORAGE, GENERATION AND VERIFICATION OF TOKENS USED TO CONTROL ACCESS TO A RESOURCE

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 123 days.

(21) Appl. No.: 17/055,460

(22) PCT Filed: May 13, 2019

(86) PCT No.: PCT/IB2019/053945
§ 371 (c)(1),
(2) Date: Nov. 13, 2020

(87) PCT Pub. No.: WO2019/220318
PCT Pub. Date: Nov. 21, 2019

(65) Prior Publication Data
US 2021/0203481 A1    Jul. 1, 2021

(30) Foreign Application Priority Data

May 14, 2018 (GB) ..................... 1807807
May 14, 2018 (GB) ..................... 1807811
(Continued)

(51) Int. Cl.
*H04L 9/06* (2006.01)
*H04L 9/08* (2006.01)
(Continued)

(52) U.S. Cl.
CPC .......... *H04L 9/0643* (2013.01); *H04L 9/0618* (2013.01); *H04L 9/0656* (2013.01);
(Continued)

(58) Field of Classification Search
CPC ... H04L 9/0643; H04L 9/0618; H04L 9/0656; H04L 9/0819; H04L 9/085; H04L 9/14;
(Continued)

(56) References Cited

U.S. PATENT DOCUMENTS 6,430,690 B1 * 8/2002 Vanstone ............. G06Q 20/341
713/168
6,834,272 B1    12/2004 Naor et al.
(Continued)

FOREIGN PATENT DOCUMENTS

CN    101860643 A * 10/2010 ........... G06F 3/1203
CN    101957898 A *  1/2011 ............ G06F 21/32
(Continued)

OTHER PUBLICATIONS

Hiroki Watanabe, Blockchain Contract: A Complete Consensus using Blockchain, 2015 IEEE 4th Global Conference on Consumer Electronics (GCCE), 2 Pages (Year: 2015).*
(Continued)

*Primary Examiner* — Shahriar Zarrineh
(74) *Attorney, Agent, or Firm* — Davis Wright Tremaine LLP

(57) ABSTRACT

A computer-implemented access method is provided. The method comprises the steps of: (i) submitting, to a blockchain (such as the Bitcoin blockchain), an access blockchain transaction addressed to a derived public key derived at least in part from a secret value and a public key; (ii) generating a verification public key based at least in part on the secret value and the public key; (iii) comparing the derived public key and the verification public key; and (iv) based on the comparison of step (iii): (a) allocating the at least one of the derived and verification public key as a further public key for verifying a further derived public key; and (b) granting
(Continued)

access to a resource associated with at least one of the secret value and the derived public key.

18 Claims, 3 Drawing Sheets

(30) Foreign Application Priority Data

| | | |
|---|---|---|
| May 14, 2018 | (GB) | 1807813 |
| May 14, 2018 | (GB) | 1807816 |
| May 14, 2018 | (WO) | PCT/IB2018/053346 |
| May 14, 2018 | (WO) | PCT/IB2018/053347 |
| May 14, 2018 | (WO) | PCT/IB2018/053349 |
| May 14, 2018 | (WO) | PCT/IB2018/053350 |

(51) Int. Cl.
    *H04L 9/32*     (2006.01)
    *H04L 9/30*     (2006.01)
    *H04L 9/14*     (2006.01)
    *H04L 9/00*     (2022.01)

(52) U.S. Cl.
    CPC ............ *H04L 9/085* (2013.01); *H04L 9/0819* (2013.01); *H04L 9/14* (2013.01); *H04L 9/30* (2013.01); *H04L 9/3213* (2013.01); *H04L 9/3239* (2013.01); *H04L 9/3297* (2013.01); *H04L 9/50* (2022.05)

(58) Field of Classification Search
    CPC ....... H04L 9/30; H04L 9/3213; H04L 9/3239; H04L 9/3297; H04L 9/50; H04L 9/3236
    See application file for complete search history.

(56) References Cited

U.S. PATENT DOCUMENTS

| | | | | |
|---|---|---|---|---|
| 7,152,158 | B2* | 12/2006 | Watanabe | H04L 9/3252 |
| | | | | 713/175 |
| 7,346,162 | B2* | 3/2008 | Slavin | H04L 9/302 |
| | | | | 380/255 |
| 7,490,069 | B2* | 2/2009 | Camenisch | G06Q 20/12 |
| | | | | 713/180 |
| 9,813,392 | B2* | 11/2017 | Lorenz | H04L 63/061 |
| 10,050,779 | B2 | 8/2018 | Alness et al. | |
| 10,114,963 | B1 | 10/2018 | Griffin et al. | |
| 11,271,736 | B2 | 3/2022 | Allen | |
| 11,308,486 | B2 | 4/2022 | Wright et al. | |
| 11,416,832 | B2 | 8/2022 | Gamaroff et al. | |
| 11,429,956 | B2 | 8/2022 | Bartolucci et al. | |
| 11,463,260 | B2 | 10/2022 | Chan | |
| 11,483,338 | B2 | 10/2022 | Jimenez-Delgado | |
| 2005/0018852 | A1* | 1/2005 | Camenisch | H04L 9/3247 |
| | | | | 380/277 |
| 2006/0179073 | A1* | 8/2006 | Kimura | G06Q 50/10 |
| | | | | 707/999.102 |
| 2007/0055880 | A1 | 3/2007 | Lauter et al. | |
| 2013/0145447 | A1* | 6/2013 | Maron | G06F 21/31 |
| | | | | 726/6 |
| 2014/0075199 | A1* | 3/2014 | Hiwatari | H04L 9/3236 |
| | | | | 713/176 |
| 2015/0201028 | A1* | 7/2015 | Hinnegan | G06Q 30/02 |
| | | | | 709/217 |
| 2015/0213433 | A1* | 7/2015 | Khan | G06Q 20/3829 |
| | | | | 705/71 |
| 2016/0330034 | A1 | 11/2016 | Back et al. | |
| 2017/0046709 | A1 | 2/2017 | Lee et al. | |
| 2017/0214522 | A1 | 7/2017 | Code et al. | |
| 2017/0293912 | A1 | 10/2017 | Furche et al. | |
| 2018/0144114 | A1* | 5/2018 | Fiske | G06F 21/32 |
| 2018/0183602 | A1* | 6/2018 | Campagna | H04L 9/14 |
| 2018/0204423 | A1* | 7/2018 | Mizuno | G07F 19/202 |
| 2018/0218166 | A1* | 8/2018 | Cachin | G06F 21/6254 |
| 2018/0276626 | A1 | 9/2018 | Laiben | |
| 2018/0278417 | A1* | 9/2018 | Choi | H04L 9/083 |
| 2018/0365686 | A1* | 12/2018 | Kondo | G06Q 20/382 |
| 2019/0163883 | A1* | 5/2019 | Savanah | G06F 21/602 |
| 2019/0197532 | A1* | 6/2019 | Jayachandran | H04L 9/0618 |
| 2019/0303623 | A1* | 10/2019 | Reddy | G06F 8/71 |
| 2019/0303887 | A1* | 10/2019 | Wright | G06Q 20/385 |
| 2019/0327218 | A1* | 10/2019 | Altenhofen | H04L 63/0471 |
| 2020/0137082 | A1* | 4/2020 | Jimenez-Delgado | H04L 9/3255 |
| 2020/0193432 | A1* | 6/2020 | Millar | G06Q 30/0283 |
| 2021/0203481 | A1 | 7/2021 | Wright | |
| 2022/0410017 | A1 | 12/2022 | Davies et al. | |

FOREIGN PATENT DOCUMENTS

| | | | | |
|---|---|---|---|---|
| CN | 108009830 | A | | 5/2018 |
| CN | 108664221 | A * | 10/2018 | G06F 3/0608 |
| EP | 1912376 | A1 | | 4/2008 |
| EP | 2003813 | A1 * | 12/2008 | H04L 9/3236 |
| EP | 3439233 | A1 | | 2/2019 |
| JP | 2002297548 | A * | 10/2002 | |
| JP | 2005033640 | A * | 2/2005 | |
| JP | 2006186903 | A | | 7/2006 |
| JP | 2008113426 | A * | 5/2008 | H04L 9/3236 |
| JP | 2020520152 | A * | 7/2020 | |
| JP | 2022549070 | A * | 11/2022 | |
| KR | 20040019766 | A * | 3/2004 | |
| KR | 100529594 | B1 * | 1/2006 | |
| KR | 100563515 | B1 * | 3/2006 | |
| TW | 201724803 | A * | 7/2017 | |
| WO | 0176298 | A1 | | 10/2001 |
| WO | WO-2004064312 | A1 * | 7/2004 | H04L 9/0891 |
| WO | WO-2004082207 | A1 * | 9/2004 | G11B 20/00086 |
| WO | 2005024606 | A1 | | 3/2005 |
| WO | WO-2012017612 | A1 * | 2/2012 | G06F 21/6254 |
| WO | 2016202952 | A1 | | 12/2016 |
| WO | 2017079652 | A1 | | 5/2017 |
| WO | 2017145010 | A1 | | 8/2017 |
| WO | 2017145021 | A1 | | 8/2017 |
| WO | 2017178955 | A1 | | 10/2017 |
| WO | 2017180382 | A1 | | 10/2017 |
| WO | 2017182601 | A1 | | 10/2017 |
| WO | WO-2017191472 | A1 * | 11/2017 | |
| WO | 2018020369 | A1 | | 2/2018 |

OTHER PUBLICATIONS

Andrychowicz et al., "Fair Two-Party Computations via Bircoin Deposits," International Conference on Financial Cryptography and Data Security, 2014, 15 pages.
Antonopoulos, "Mastering Bitcoin—Unlocking Digital Cryptocurrencies," O'Reilly Media, Inc., Dec. 20, 2014, 282 pages.
Asokan et al., "Server-Supported Signatures," Proceedings of the European Symposium on Research in Computersecurity, Sep. 1, 1996, 7 pages.
Bennink et al., "An Analysis of Atomic Swaps on and Between Ethereum Blockchains using Smart Contracts," Technical Report, 2018, 26 pages.
Bguyen et al. "Digital Coins Based on Hash Chain," 1997, 8 pages.
Bitcoin Forum, "[ANN][SDC] ShadowCoin |ShadowChat [EM] | ShadowSend [Anon] | ShadowGo [Mobile]," retrieved from https://bitcointalk.org/index.php?topic=700087.msg8153845, Aug. 2, 2014, 6 pages.
Bowe et al., "Hashed Timelocked Contract Transactions," retrieved from https://github.com/bitcoin/bips/blob/master/bip-0199.mediawiki, Sep. 5, 2017, 2 pages.
Bytecoin, "Untraceable Transactions Which Can Contain a Secure Message are Inevitable," retrieved from https://bitcointalk.org/index.php?topic=5965.0, Apr. 17, 2011, 4 pages.
Courtois et al. "Stealth Address and Key Management Techniques in Blockchain Systems," retrieved from http://www.scitepress.org/Papers/2017/62700/62700.pdf, 2017, 8 pages.
Cross, "Bitcoin/BIPS," retrieved from https://github.com/bitcoin/bips/blob/master/bip-0199.mediawiki, Sep. 5, 2017, 4 pages.

(56) References Cited

OTHER PUBLICATIONS

Crosschain, "Decred Cross-Chain Atomic Swapping," retrieved from https://github.com/decred/atomicswap/blob/46df8ffd9f19658101b17326bb87fb4ae1e7e77b/README.md, Apr. 16, 2018, 8 pages.
Crosschain, "Cross-Chain Bitcoin & Monero Atomic Swap," retrieved from https://github.com/GuggerJoel/XMR-BTCatomic/blob/44568f3563205a09228ceb321e9327eb9bde61e2/README.md, Dec. 30, 2017, 3 pages.
Gugger, "Cross-chain Bitcoin & Monero Atomic Swap," retrieved from https://github.com/GuggerJoel/XMR-BTCatomic/blob/44568f3563205a09228ceb321e9327eb9bde61e2/README.md, Dec. 30, 2017, 3 pages.
Herlihy, "Atomic Cross-Chain Swaps," May 18, 2018, 10 pages.
International Search Report and Written Opinion for Application No. PCT/IB2018/053346, dated Jan. 21, 2019, filed May 14, 2018, 11 pages.
International Search Report and Written Opinion for Application No. PCT/IB2018/053347, dated Feb. 4, 2019, filed May 14, 2018, 12 pages.
International Search Report and Written Opinion for Application No. PCT/IB2018/053349, dated Jan. 21, 2019, filed May 14, 2018, 11 pages.
International Search Report and Written Opinion for Application No. PCT/IB2019/053771, dated Jul. 15, 2019, filed May 8, 2019, 11 pages.
International Search Report and Written Opinion for Application No. PCT/IB2019/053944, dated Jul. 19, 2019, filed May 13, 2019, 12 pages.
International Search Report and Written Opinion for Application No. PCT/IB2019/053945, dated Jul. 19, 2019, filed May 13, 2019, 12 pages.
Iotex, "Blockchain Privacy-Enhancing Technology Series—Stealth Address (I)," retirved from https://hackernoon.com/blockchain-privacy-enhancing-technology-series-stealth-address-ic8a3eb4e4e43, May 15, 2018, 7 pages.
Kirsten et al., "Anonymous Atomic Swaps Using Homomorphic Hashing," retrieved from https://papers.ssrn.com/sol3/papers.cfm?abstract_id=3235955, Aug. 30, 2018, 8 pages.
Lamport et al., "Password Authentication with Insecure Communication," Communications of the ACM, 24(11): Nov. 1, 1981, 3 pages.
Lamport, "Constructing Digital Signatures from a One Way Function," retrieved from https://www.microsoft.com/en-us/research/uploads/prod/2016/12/Constructing-Digital-Signatures-from-a-One-Way-Function.pdf, Oct. 18, 1979, 3 pages.
Mazonka et al., "Hasq Hash Chains," Hasq Technology Pty Ltd, 2014, 5 pages.
Nakamoto, "Bitcoin: A Peer-to-Peer Electronic Cash System," Bitcoin, Oct. 31, 2008, https://bitcoin.org/bitcoin.pdf, 9 pages.

Nguyen et al., "Digital Coins Based on Hash Chain," retrieved from https://pdfs.semanticscholar.org/a7b5/71ed5b601ac1f0c00f5c5773b88ed1e7fe75.pdf, Oct. 2017, 8 pages.
Rivest et al., "PayWord and MicroMint: Two Simple Micropayment Schemes," MIT Laboratory for Computer Science, Apr. 27, 2001, 19 pages.
Saberhagen, "CryptoNote v 2.0," retrieved from https://cryptonote.org/whitepaper.pdf, Oct. 17, 2013, 20 pages.
Satoshi et al., "Connection Limits," Bitcoin Forum, Aug. 9, 2010, https://bitcointalk.org/index.php?topic=741.0; prev_next=prev, 2 pages.
Shamir et al., "PayWord and MicroMint: Two Simple Micropayment Schemes," retrieved from https://people.csail.mit.edu/rivest/RivestShamir-mpay.pdf, Apr. 27, 2001, 19 pages.
Skowronski, "Fully Distributed Gridnet Protocol, with No Trusted Authorities," International Conference on Information Networking, Jan. 11, 2017, 6 pages.
Stealth, "Blockchain Privacy-Enhancing Technology Series-Stealth Address (I)," retrieved from https://hackernoon.com/blockchain-privacy-enhancing-technology-series-stealth-address-ic8a3eb4e4e43, May 15, 2018, 7 pages.
Stone, Hash Chain Tokenization Criticism, retrieved from https://www.yours.org/content/hash-chain-tokenization-criticism-e2b0ae5a5abf, Dec. 31, 2018, 1 page.
UK Commercial Search Report dated Jan. 4, 2019, Patent Application No. GB1807807.1, 10 pages.
UK Commercial Search Report dated Jan. 4, 2019, Patent Application No. GB1807811.3, 11 pages.
UK Commercial Search Report dated Jan. 4, 2019, Patent Application No. GB1807813.9, 10 pages.
UK Commercial Search Report dated Jan. 4, 2019, Patent Application No. GB1807816.2, 10 pages.
UK IPO Search Report dated Nov. 13, 2018, Patent Application No. GB1807807.1, 8 pages.
UK IPO Search Report dated Nov. 13, 2018, Patent Application No. GB1807811.3, 8 pages.
UK IPO Search Report dated Nov. 14, 2018, Patent Application No. GB1807813.9, 7 pages.
UK IPO Search Report dated Nov. 14, 2018, Patent Application No. GB1807816.2, 7 pages.
Van Saberhagen, "CryptoNote v 2.0," Oct. 17, 2013, https://bytecoin.org/old/whitepaper.pdf, 20 pages.
Wikipedia, "Hash Chain," retrieved from https://en.wikipedia.org/w/index.php?title=Hash_chain&oldid=755636747, Dec. 19, 2016, 3 pages.
Crypto Reporter, "Waltonchain Review: RFID and Blockchain for Supply Chain Management", https://t.me/crypto_reporter, Jan. 23, 2018, 16 pages.
USPTO Notice of Allowance of U.S. Appl. No. 17/898,158 dated Jul. 26, 2023, 21 pages.

* cited by examiner

SYSTEMS AND METHODS FOR STORAGE, GENERATION AND VERIFICATION OF TOKENS USED TO CONTROL ACCESS TO A RESOURCE

This invention relates generally to secure and efficient solutions for the transfer and access control of digital resources, and more particularly to the transfer, storage, communication, generation and verification of electronic/digital tokens which serve as an access key. The invention is particularly suited, but not limited to, use with a blockchain such as, for example, the Bitcoin blockchain.

In this document we use the term 'blockchain' to include all forms of electronic, computer-based, distributed ledgers. These include consensus-based blockchain and transaction-chain technologies, public and private ledgers permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. The term "Bitcoin" is used herein to include all versions and variations of blockchain implementations which derive from, or are based on, the Bitcoin protocol/platform.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of tokens to represent and transfer resources or control thereof, or allow access to those resources, via the blockchain. The resource associated with the token may be an electronic resource or a physical resource, a virtual or real world resource. A potentially sensitive or secret resource can be represented by the token which has no discernible meaning or value. The token thus serves as an identifier that allows the real-world resource to be referenced from the blockchain.

It is desirable to provide a secure and efficient way of communicating, storing, generating and/or transferring tokens from one user to another while minimising the use of computing resources. Such an improved solution has now been devised.

Thus, in accordance with the present invention there is provided a method as defined in the appended claims.

In accordance with the invention there may be provided a computer-implemented access or control method, comprising the steps of:
(i) submitting, to a blockchain, an access blockchain transaction addressed to a derived public key derived at least in part from a secret value and a public key;
(ii) generating a verification public key based at least in part on the secret value and the public key;
(iii) comparing the derived public key and the verification public key; and
(iv) based on the comparison of step (iv): (a) allocating or designating the derived public key and/or the verification public key as a further public key for verifying a further derived public key; and (b) granting access to a resource associated with at least one of the secret value and/or the derived public key.

Steps (i) and (ii) may be performed by a first party. Steps (iii) and (iv) may be performed by a second party. The term "user" may be used interchangeably herein with "party". The terms "party" and "user" are intended to include a human user, a computing resource, a client, a server and/or a network node.

The method may comprise the step of sending the secret value from a first user to a second user.

The method may comprise the step of generating the secret value. The secret value may be a token. This may be performed by the first user.

The comparison of step (iii) may comprise the application of at least one test or criterion. The test or criterion may comprise an assessment as to whether the derived public key matches, or is identical to, the verification public key. The test or criterion may comprise a threshold-based assessment.

Such a method has increased security and reliability by providing for checking of the provenance of each data item, increased efficiency by decreasing the amount of storage space and memory required for verification purposes, and increased security and reduction in the likelihood of errors occurring by decreasing the amount of data being communicated.

The method may further comprising repeating steps (ii) to (iv) using a further secret value and the further public key.

This records the events on the blockchain, thereby providing the advantage of making the records public and immutable. Thus, the blockchain may serve as a communication vehicle or mechanism for sharing, transmitting or transferring the public key from one user to another. The second user can view the public key from the blockchain. This avoids or minimises direct communication of the keys between the first and second user, which may give rise to interception via unauthorised parties. The invention provides a solution in which the users may not be known to each other or have a trusted relationship. This provides improved security and an improved communication solution for the transfer of data items. Moreover, the public and immutable nature of the blockchain can be used to verify the event(s) that have occurred and the public key(s) that the first user has used.

The secret value may be a data item of a first one-way function chain of data items, and the method may further comprise the steps of:
(v) providing a verification data item of the first one-way function chain;
(vi) applying the first one-way function to the data item;
(vii) comparing the output of step (vi) to the verification data item; and
(viii) performing step (iv) based also on the outcome of step (vii).

Applying a one way function, such as a cryptographic hash function, to a data item results in a further data item. Subsequent application of the one way function to the further data item results in a yet further data item. In this way, a chain of data items is generated, wherein the members of the chain of data items are deterministically linked to one another via the application of the one way function. Such a chain is called a one way function chain of data items. A verification data item is a data item which is a member of the one way function chain and used for verification purposes, described in detail below.

This provides a secure and recorded method of transferring the ability to access at least one resource associated with a respective at least one data item between users.

The method may further comprise the following steps:
(ix) providing a verification data item of a second one-way function chain of data items,
(x) submitting, to a blockchain, an exchange blockchain transaction unlockable upon provision of at least one verification item of the first chain and the verification data item of the second chain, wherein such unlocking causes at least one data item of the second chain to be associated with a resource.

This provides a secure and recorded method of transferring the ability to access at least one resource associated with a respective at least one data item between users.

The method may further comprise the step of unlocking the exchange blockchain transaction and repeating steps (ii) to (iv) using a data item of the second chain and the verification data item of the second chain.

This provides the advantage of enabling a new user to securely access at least one resource.

The method may further comprise the step of submitting, to a blockchain, a return blockchain transaction arranged to return control of an input of the exchange blockchain transaction after elapse of a lock time.

This prevents a dishonest user from locking the input of the exchange blockchain transaction indefinitely, thereby providing the advantage of increasing the versatility of the method.

The method may further comprise the step of storing an initial data item of a one-way function chain, from which at least one data item of the one-way function chain is calculable.

This provides the advantage of further reducing the storage requirements and correspondingly increasing the efficiency of the method.

Step (viii) may further comprise deleting the verification data item.

This provides the advantage of yet further reducing the storage requirements and correspondingly increasing the efficiency of the method.

An access blockchain transaction may comprise information identifying the resource. For 20 example, the blockchain transaction may comprise a URL, or hash thereof, pointing to an off-chain data repository containing information about the resource. The URL may be stored in the transaction's metadata.

This provides the advantage that information about the resource may be securely communicated.

The invention also provides a system, comprising:
a processor and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

These and other aspects of the present invention will be apparent from and elucidated with reference to, the embodiment described herein. An embodiment of the present invention will now be described, by way of example only, and with reference to the accompany drawings, in which.

Figure 1:
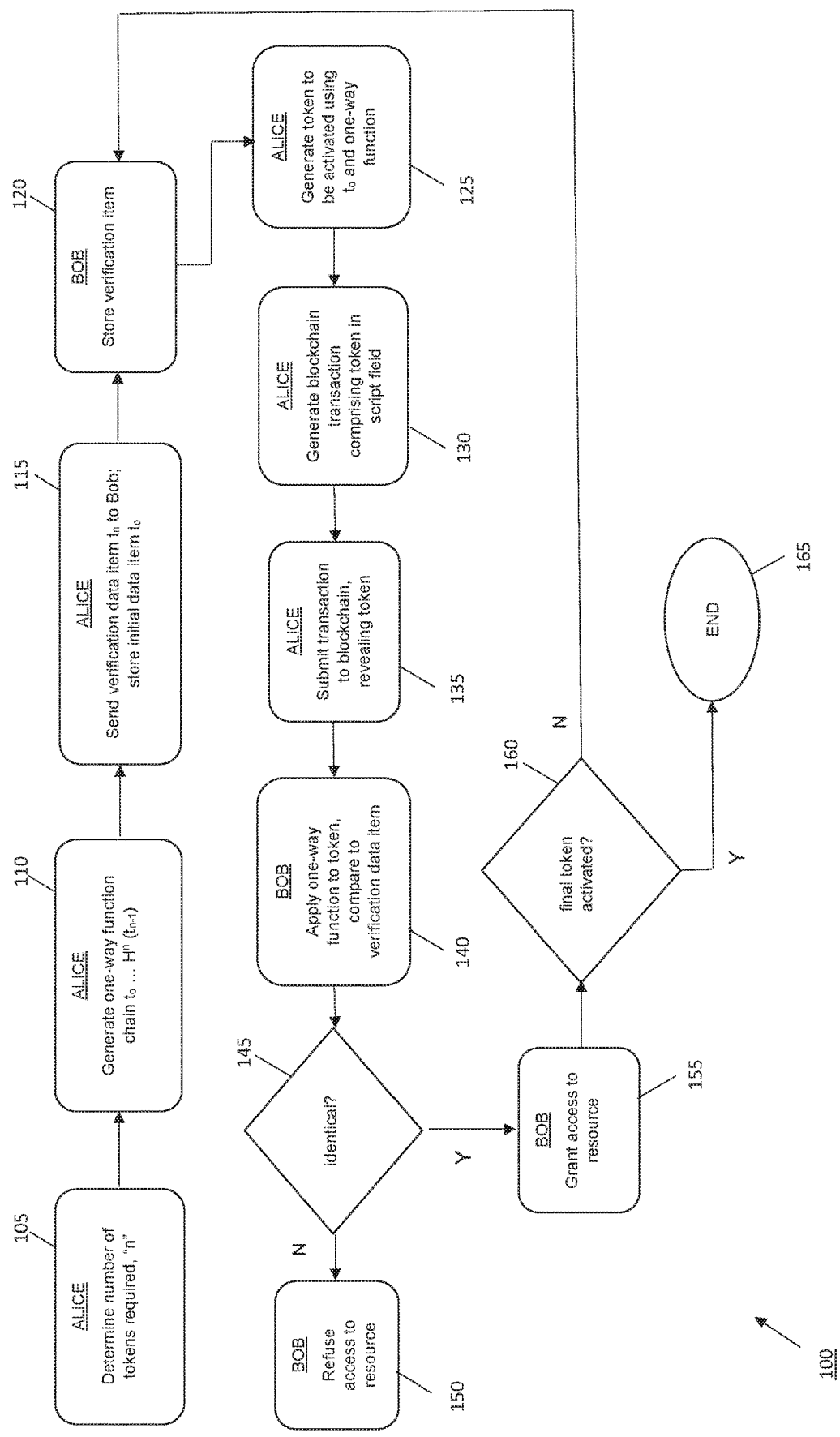
FIG. 1 is a flow chart illustrating steps for generating and activating tokens.

The present invention enables tokens to be efficiently created and stored using a cryptographically secure one-way function chain, such as a hash chain. This method has advantages of performance, storage, scalability, and reliability. Tokens can be securely sold to other users. Tokens can be provably linked to public keys, thereby providing a universal method of activating and verifying tokens which is private and secure.

A token is a data structure, or data item, which ensures trusted communication between one or more different parties over a network. For example, a token can be used for representing the transfer of control of a resource from one party to another, and/or for accessing controlled resources such as goods or services. For example, by activating a token a customer may be granted access to resources such as a computing or electronic resource, a hotel room, hire car or toll road; goods such as prescription drugs, consumer products, or items in a supply chain; and services such as a session on a website or computer application. The token itself may be used as a key to unlock these resources or it may point to an external state that contains further information about the resources such as a Distributed Hash Table (DHT).

A token is typically represented as a 256-bit number, and once activated may have a temporal limit (for example, if the token represents granted access to a secure data repository for 24 hours) and may a finite number of uses (for example, once the token has been activated and the 24 hours has elapsed, the access to the secure data repository is rescinded until a new, different, token is issued and activated).

We will refer to the party who would like to activate a token as the 'client' and the party that would like to verify that a token has been activated as the 'server'.

| Role | | Function |
|---|---|---|
| Alice | Client | Activates tokens |
| Bob | Server | Verifies tokens have been activated |

A client activates a token by providing it to a server. This may be performed by publically revealing the token on the blockchain. This is achieved by completing a transaction that records the value of the token within the transaction data or meta-data which the server may verify. Note that the output of this transaction does not need to be spent.

The required amount of tokens can scale linearly with the amount of events which require their utilisation, for example if a user requires access to the secure data repository a number of times, the same number of tokens may be generated. A known method for creating multiple tokens for future use is for each token to be generated separately, such as each being randomly generated. All of the tokens are then stored in a database by both the client and the server.

However, in the present invention, only one token at a time needs to be stored by each of the client and server. This is achieved by implementing a rule that each token is related to the token before it through via successive applications of a cryptographically secure one-way function, such as a hash function. For example, token $t_i$ is related to token $t_{i-1}$ in accordance with the rule:

$$t_i = H(t_{i-1}) \quad (1)$$

where H is a hash function, such as SHA-256. To activate a token $t_{i-1}$, a transaction containing $t_{i-1}$ is submitted to the blockchain, where $t_{i-1}$ is a solution to the hash puzzle of the token $t_i$ before it, thereby publicly revealing $t_{i-1}$ provably linking each token in the chain.

Advantages of the present invention include:
- The client and server only have to store one token at any given time which saves memory. If one token is a 256 bit number and Alice would like to use n tokens she is saving (n−1)*256 bits of space using this method compared with storing each token individually in a database.
- Only a small amount of data needs to be communicated between the client and server, which improves performance, security and reliability.
- Since tokens are calculated rather than stored it prevents the accidental loss of a token through being destroyed or corruption of data.
- An inspectable record is available for the tokens as each one is provably linked to the previous token through the solution to a hash puzzle.

Referring to FIG. 1, a method (100) for a client Alice to activate a sequence of tokens that a server Bob can verify will now be described. The tokens are generated by Alice using a hash chain. The following steps are performed:
1. Alice and Bob agree on a number n (105) of resources which require the activation of a token to access.
2. Alice generates a 256-bit number $t_0$ (110). This could be achieved by hashing some input data or it could be a random number. The value $t_0$ will be the last token she uses. She hashes this number n times to calculate $$t_n = H^n(t_0).$$

where $t_n$ is a verification data item rather than a token. She sends $t_n$ to Bob (115).

Alice stores $t_0$ and no other value. She will use this value to calculate n tokens $t_{n-1}, \ldots, t_1, t_0$ using rule (1). This creates an access chain or hash chain of tokens that satisfies:

$$t_{n-1} = H(t_{n-2})$$
$$t_{n-2} = H(t_{n-3})$$
$$\vdots$$
$$t_1 = H(t_0).$$

Note also that $t_n = H(t_{n-1})$.

The first token she uses will be $t_{n-1}$ and the last token she uses will be $t_0$. The verification data item $t_n$ is used only for verifications purposes and is not itself a token.

3. Bob stores $t_n$ (120) and no other value. Note that Bob cannot calculate $t_0, t_1, \ldots, t_{n-1}$.
4. Alice calculates the value of her first token $t_{n-1} = H^{n-1}(t_0)$ (125) and activates it by creating a transaction that contains the token (130). The token may be stored, for example, in the transaction metadata or in the locking or unlocking script. It may even be stored in the public key of the receiver's address itself; details of this are discussed in relation to a further embodiment of the invention below. Alice submits the transaction to the blockchain, which reveals the token (135).
5. Bob can now see and read the revealed token, and verifies that Alice has activated the correct token by checking that $t_n = H(t_{n-1})$ (140). If the hash of the token revealed on the blockchain is not identical (145) to the verification item that Bob has stored, Bob refuses access to the resource (150). Otherwise, Bob allows access (155), stores $t_{n-1}$, and deletes $t_n$. $t_{n-1}$ becomes the next verification data item in the sequence.
6. Alice activates another token by repeating step 4 but with $t_{n-2}$. Bob validates this token by repeating step 5 but checking that $t_{n-1} = H(t_{n-2})$. This process is repeated iteratively (160) until all n tokens have been activated and verified (165).

Figure 2:
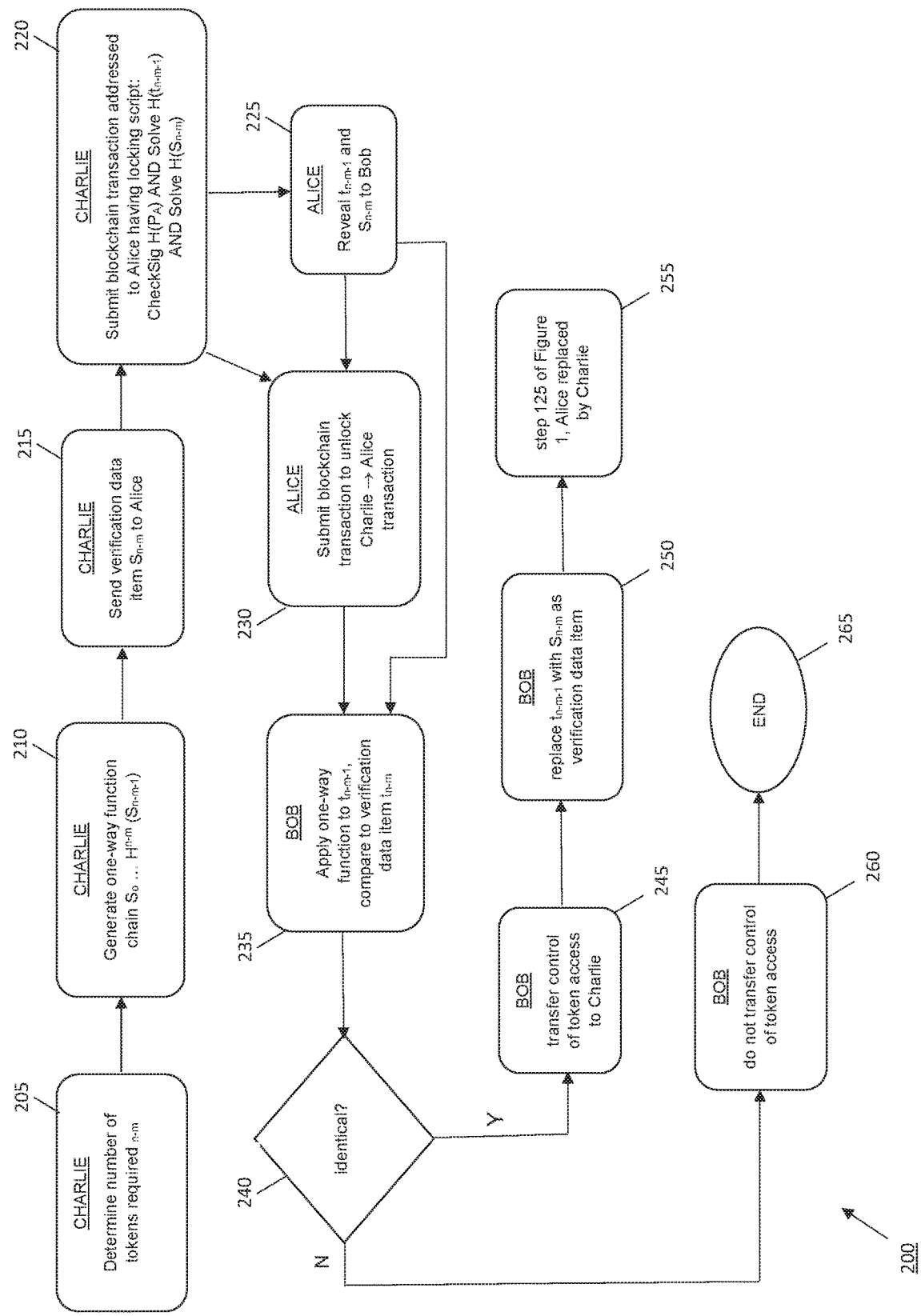
FIG. 2 is a flow chart illustrating steps for exchanging control of tokens.

A method (200) for transferring the ability to access the resource(s) is described with reference to FIG. 2.

Suppose that Alice has activated m of her tokens $t_{n-1}, \ldots, t_{n-m}$ and Charlie would like to gain control of the remaining n−m tokens $t_{n-m-1}, \ldots, t_0$ for the fulfilment of one or more conditions. He can do this securely (without trusting Alice) as follows.

Alice and Charlie agree on a transfer of Alice's remaining tokens to Charlie (205). Alice sends Charlie $H(t_{m-n-1})$ the hash of her next unspent token.

Charlie creates a new token $s_0$. He then generates a series of n−m tokens $s_{m-n-1}, \ldots, s_0$ (210) using the rule $$s_{m-n-1} = H(s_{m-n-2})$$
$$s_{m-n-2} = H(s_{m-n-3})$$
$$\vdots$$
$$s_1 = H(s_0).$$

He also calculates $s_{m-n} = H(s_{m-n-1})$, a verification data item, which is used for verification purposes. Charlie sends $s_{m-n}$ to Alice (215).

Charlie submits to the blockchain a transaction satisfying the one or more conditions (220), where the unlocking script of this transaction is of the form:

LockingScript=CheckSig $H(P_A)$ AND Solve $H(t_{n-m-1})$ AND Solve $H(s_{n-m})$, where $P_A$ is Alice's public key. The address could be a Pay to Public Key Hash (P2PKH) or a Pay To Script Hash (P2SH) address controlled by Alice.

Alice now informs the server Bob that she has transferred the tokens to Charlie. She does this by informing Bob of her next token $t_{m-n-1}$ and the verification data item $s_{m-n}$ (225). Bob can be sure that only Alice can do this as only Alice knows the value of $t_{m-n-1}$ that Bob can verify is the token which hashes to the current verification item $t_{m-n}=H(t_{m-n-1})$ (235).

If Alice is dishonest and does not give the server Bob this information it will in any case be publicly exposed on the blockchain once she spends the transaction from Charlie (230), as the transaction unlocking script has the form UnlockingScript=$[s_{m-n}][t_{n-m-1}][Sig\ P_A][P_A]$.

If the hash is identical (240) to the current verification item, Bob transfers control of the tokens to Charlie (245) and replaces replace $t_{n-m-1}$ with $s_{n-m}$ as the next verification data item (250). Otherwise, Bob does not transfer control of the tokens to Charlie (260).

Bob will now be able to validate Charlie's first token $s_{m-n-1}$ by checking that $s_{m-n}=H(s_{m-n-1})$ (255).

Therefore, Charlie can prove to Bob that he has received the tokens from Alice.

It is also possible to include a timelock refund of the transaction from Charlie to Alice so that the inputs of the transaction he submitted cannot be locked indefinitely by Alice.

Tokens in the access chain described above can be provably linked to public/private keys. Note that this method of linking public/private keys with tokens does not require the tokens be linked through a one-way function or hash chain as described above, and works if each token is created individually with no connection to a previous token. However, the advantages of using a token access chain translate to the linked keys. The linked keys then form an access chain form an inspectable sequence of public/private keys that are provably linked to one another through the one-way function of the access chain.

One application for this is for Alice to activate her tokens by making transactions to these public key addresses. Bob can verify that the token has been activated by observing the public key address itself.

This helps keep the size of the transactions as small as possible, and improves privacy as only a standard transaction is required, as opposed to a custom transaction relating to a token scheme. It is also a universal method for any public/private key system valid on any blockchain protocol or platform.

Figure 3:
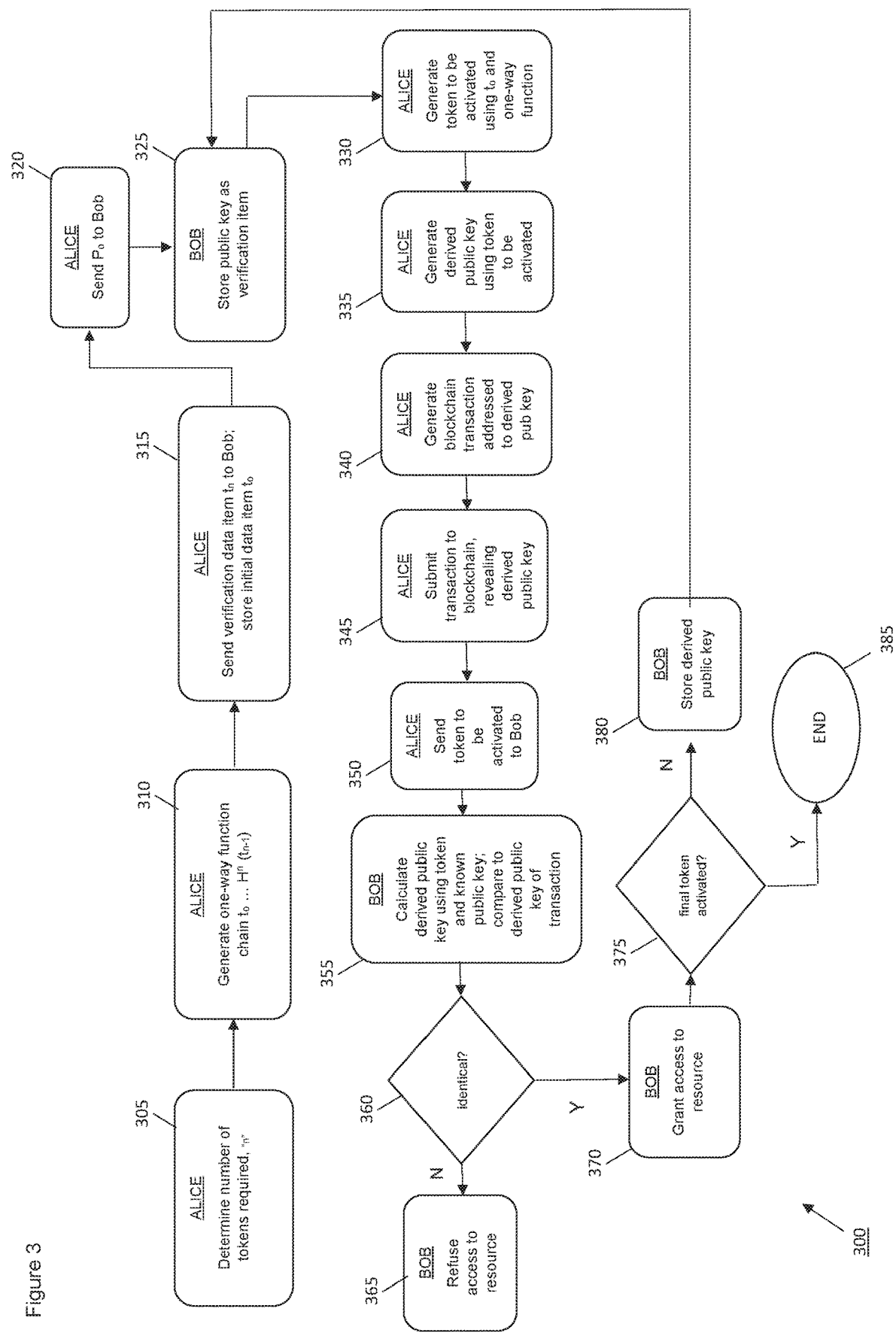
FIG. 3 is a flow chart illustrating steps for activating tokens using public keys.

Referring to FIG. 3, a method (300) for a client, Alice, to activate a sequence of tokens that a server, Bob, can verify will now be described.

Let $P_0$ denote Alice's public key and $S_0$ her private key. In an elliptic curve digital signature algorithm (ECDSA) system, the public key/private key pairs are related by $P_0=S_0 \cdot G$, where G is the generating point of an elliptic curve. However, any equivalent public/private key system may be used to carry out the steps of the method.

After agreeing on the number of tokens (305), generating the tokens from an initial value $t_0$ (310), and sending verification data item $t_n$ of the chain to Bob (315), Alice shares her public key $P_0$ with Bob (320). Bob stores this as the verification data item (325).

Having generated first token first token $t_{n-1}$ (330), Alice uses it to create derived public key $P_1=(S_0+t_{n-1})\cdot G=P_0+t_{n-1}\cdot G(335)$.

As only Alice knows $t_{n-1}$, only she can create this public key. The public key $P_1$ can be provably linked with the first token in Alice's access chain.

Alice can use this public key as an address to which she can send a transaction in order to activate her first token. Alice generates a blockchain transaction addressed to this public key (340) and submits it to the blockchain (345), thereby publicly revealing the public key.

Alice then sends $t_{n-1}$ to Bob (350). Bob can then verify that the token $t_{n-1}$ has been activated by checking that Alice has made a transaction to $P_1=P_0+t_{n-1}\cdot G$ (355). If the public key revealed by the submitted transaction is identical (360) to one calculated by Bob using public key $P_0$ and token $t_{n-1}$, Bob allows Alice access to the resource (370). Otherwise, Bob refuses access (365).

This process can be repeated iteratively (375): if the final token has not been activated, Bob stores the revealed public key as the next verification data item (380) and the process continues; otherwise, the process ends (385).

This method creates n public keys, each provably linked uniquely to a token in the access chain, as follows:

$$P_1 = P_0 + t_{n-1} \cdot G$$
$$P_2 = P_1 + t_{n-2} \cdot G$$
$$\vdots$$
$$P_n = P_{n-1} + t_0 \cdot G.$$

This process relies on th tokens taking values in the same group as the private keys, which in the case of the Bitcoin scep256k1 protocol is $\mathbb{Z}_n^*$, where n is the order of the elliptic curve generator G. This number is slightly less than $2^{256}$. If the tokens are not in this group then one can pass them through a hash function such as SHA-256 and then take the modulus with respect to n. If any of the tokens are 0 after being put through this process then Alice must start again and choose a different seed token to.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented access method, comprising:
   (i) submitting, to a blockchain, an access blockchain transaction addressed to a derived public key derived at least in part from a secret value and a public key;
   (ii) generating a verification public key based at least in part on the secret value and the public key;
   (iii) comparing the derived public key and the verification public key; and
   (iv) based on the comparison of step (iii):
      (a) allocating at least one of the derived public key and/or the verification public key as a further public key for verifying a further derived public key; and
      (b) granting access to a resource associated with at least one of the secret value and/or the derived public key;
   wherein the secret value is a data item of a first one-way function chain of data items, and further comprising:
      (v) providing a verification data item of the first one-way function chain;
      (vi) applying the first one-way function to the data item;
      (vii) comparing output of step (vi) to the verification data item;
      (viii) performing step (iv) based also on outcome of step (vii);
      (ix) providing a verification data item of a second one-way function chain of data items; and
      (x) submitting, to a blockchain, an exchange blockchain transaction unlockable upon provision of at least one verification item of the first one-way function chain and the verification data item of the second one-way function chain, wherein such unlocking causes at least one data item of the second one-way function chain to be associated with a resource;
   wherein steps (i), (v), (ix), and (x) are performed by a first party and steps (ii), (iii), (iv), and (vi) to (viii) are performed by a second party; and
   wherein the method further comprises sending the secret value from a first user to a second user.

2. The method of claim 1, wherein step (iii) comprises the application of at least one test or criterion.

3. The method of claim 2, wherein the at least one test or criterion comprises an assessment as to whether the derived public key matches, or is identical to, the verification public key.

4. The method of claim 2, wherein the at least one test or criterion comprises a threshold-based assessment.

5. The method of claim 1, further comprising repeating steps (ii) to (iv) using a further secret value and the further public key.

6. The method of claim 1, further comprising unlocking the exchange blockchain transaction and repeating steps (ii) to (iv) using a data item of the second one-way function chain and the verification data item of the second one-way function chain.

7. The method of claim 1, further comprising submitting, to a blockchain, a return blockchain transaction arranged to return control of an input of the exchange blockchain transaction after elapse of a lock time.

8. The method of claim 1, further comprising storing an initial data item of a one-way function chain, from which at least one data item of the one-way function chain is calculable.

9. The method of claim 1, wherein step (viii) further comprises deleting the verification data item.

10. The method of claim 1, wherein an access blockchain transaction comprises information identifying the resource.

11. A system, comprising:
   a processor; and
   memory including executable instructions that, as a result of execution by the processor, causes the system to:
      (i) submit, to a blockchain, an access blockchain transaction addressed to a derived public key derived at least in part from a secret value and a public key;
      (ii) generate a verification public key based at least in part on the secret value and the public key;
      (iii) compare the derived public key and the verification public key; and
      (iv) based on the comparison of step (iii):
         (a) allocate at least one of the derived public key and/or the verification public key as a further public key for verifying a further derived public key; and
         (b) grant access to a resource associated with at least one of the secret value and/or the derived public key;
   wherein the secret value is a data item of a first one-way function chain of data items, and the executable instructions further cause the system to:
      (v) provide a verification data item of the first one-way function chain;
      (vi) apply the first one-way function to the data item;
      (vii) compare output of step (vi) to the verification data item;
      (viii) perform step (iv) based also on outcome of step (vii);
      (ix) provide a verification data item of a second one-way function chain of data items; and
      (x) submit, to a blockchain, an exchange blockchain transaction unlockable upon provision of at least one verification item of the first one-way function chain and the verification data item of the second one-way function chain, wherein such unlocking causes at least one data item of the second one-way function chain to be associated with a resource;
   wherein steps (i), (v), (ix), and (x) are performed by a first party and steps (ii), (iii), (iv), and (vi) to (viii) are performed by a second party; and
   wherein the executable instructions further cause the system to send the secret value from a first user to a second user.

12. A non-transitory computer-readable storage medium having stored thereon executable instructions that, as a result of being executed by a processor of a computer system, cause the computer system to:
   (i) submit, to a blockchain, an access blockchain transaction addressed to a derived public key derived at least in part from a secret value and a public key;
   (ii) generate a verification public key based at least in part on the secret value and the public key;
   (iii) compare the derived public key and the verification public key; and
   (iv) based on the comparison of step (iii):
      (a) allocate at least one of the derived public key and/or the verification public key as a further public key for verifying a further derived public key; and
      (b) grant access to a resource associated with at least one of the secret value and/or the derived public key;
   wherein the secret value is a data item of a first one-way function chain of data items, and the executable instructions further cause the computer system to:

(v) provide a verification data item of the first one-way function chain;
(vi) apply the first one-way function to the data item;
(vii) compare output of step (vi) to the verification data item;
(viii) perform step (iv) based also on outcome of step (vii);
(ix) provide a verification data item of a second one-way function chain of data items; and
(x) submit, to a blockchain, an exchange blockchain transaction unlockable upon provision of at least one verification item of the first one-way function chain and the verification data item of the second one-way function chain, wherein such unlocking causes at least one data item of the second one-way function chain to be associated with a resource;
wherein steps (i), (v), (ix), and (x) are performed by a first party and steps (ii), (iii), (iv), and (vi) to (viii) are performed by a second party; and
wherein the executable instructions further cause the computer system to send the secret value from a first user to a second user.

13. The system of claim 11,
wherein step (iii) comprises the application of at least one test or criterion.

14. The system of claim 11,
wherein the executable instructions further cause the system to repeat steps (ii) to (iv) using a further secret value and the further public key.

15. The system of claim 11,
wherein the memory further causes the system to unlock the exchange blockchain transaction and repeat steps (ii) to (iv) using a data item of the second one-way function chain and the verification data item of the second one-way function chain.

16. The non-transitory computer-readable storage medium of claim 12, wherein step (iii) comprises the application of at least one test or criterion.

17. The non-transitory computer-readable storage medium of claim 12, wherein the executable instructions further cause the computer system to at least repeat steps (ii) to (iv) using a further secret value and the further public key.

18. The non-transitory computer-readable storage medium of claim 12, wherein the executable instructions further cause the computer system to at least unlock the exchange blockchain transaction and repeat steps (ii) to (iv) using a data item of the second one-way function chain and the verification data item of the second one-way function chain.

* * * * *